US011557889B2

(12) United States Patent
Kaleshnik

(10) Patent No.: US 11,557,889 B2
(45) Date of Patent: Jan. 17, 2023

(54) APPARATUS AND METHOD FOR INSTALLING WIRE BEHIND EXISTING WALLS

(71) Applicant: Christopher Kaleshnik, Portland, OR (US)

(72) Inventor: Christopher Kaleshnik, Portland, OR (US)

(73) Assignee: PROMETHEAN INNOVATIONS, LLC, Portland, OR (US)

( * ) Notice: Subject to any disclaimer, the term of this patent is extended or adjusted under 35 U.S.C. 154(b) by 80 days.

(21) Appl. No.: 17/306,017

(22) Filed: May 3, 2021

(65) Prior Publication Data

US 2021/0351578 A1 Nov. 11, 2021

Related U.S. Application Data

(60) Provisional application No. 63/020,385, filed on May 5, 2020.

(51) Int. Cl.
*H02G 3/22* (2006.01)
*H02G 3/38* (2006.01)

(52) U.S. Cl.
CPC ............... *H02G 3/22* (2013.01); *H02G 3/286* (2013.01)

(58) Field of Classification Search
CPC .......... H02G 1/081; H02G 1/083; H02G 3/22; H02G 3/286; H02G 3/36
See application file for complete search history.

(56) References Cited

U.S. PATENT DOCUMENTS

2001/0019122 A1\* 9/2001 Mayr ................. H02G 1/081
254/134.3 FT
2002/0189671 A1\* 12/2002 Beals .................. G02B 6/502
137/317

(Continued)

FOREIGN PATENT DOCUMENTS

GB          576236      3/1946
JP       2013207878    10/2013

OTHER PUBLICATIONS

Patent Cooperation Treaty, International Searching Authority. International Search Report and The Written Opinion of the International Searching Authority. Application No. PCT/US21/30426, dated Sep. 1, 2021.

*Primary Examiner* — Timothy J Thompson
*Assistant Examiner* — Rhadames Alonzo Miller
(74) *Attorney, Agent, or Firm* — Mohr Intellectual Property Law Solutions, PC

(57) ABSTRACT

A system for pulling wire behind a wall is provided. One embodiment comprises a cylindrical weight defined by an outside diameter and a first length, and a tubular body with a hollow interior defined by an inside diameter that is greater than the outside diameter of the cylindrical weight and a second length that is greater than the first length. A distal end of the tubular body includes a tip configured to penetrate a material that is behind the wall, wherein when oriented in a vertical position behind the wall, and wherein in response to drawing the cylindrical weight upward through the tubular body and then releasing the cylindrical weight, the cylindrical weight travels downward towards the distal end of the tubular body and impacts the tip such that momentum of the downward travelling cylindrical weight is transferred to the tip, thereby driving the tubular body downward through the material.

17 Claims, 6 Drawing Sheets

(56) References Cited

U.S. PATENT DOCUMENTS

| | | | | |
|---|---|---|---|---|
| 2004/0065872 A1* | 4/2004 | Watson | H02G 1/081 | 254/134.3 FT |
| 2005/0161650 A1* | 7/2005 | Harley | H02G 1/081 | 294/132 |
| 2005/0179014 A1* | 8/2005 | Diggle, III | H02G 1/083 | 254/134.3 FT |
| 2005/0179015 A1* | 8/2005 | Diggle, III | H02G 1/083 | 254/134.3 FT |
| 2005/0179016 A1* | 8/2005 | Rivers | H02G 1/081 | 254/134.3 FT |
| 2006/0027795 A1* | 2/2006 | Crawford | H02G 1/081 | 254/134.3 FT |
| 2006/0054874 A1* | 3/2006 | Oberli | H02G 1/086 | 254/134.4 |
| 2007/0001157 A1* | 1/2007 | Quick | H02G 1/081 | 254/134.3 FT |
| 2008/0017837 A1* | 1/2008 | Steele | H02G 1/081 | 254/1 |
| 2008/0054236 A1* | 3/2008 | Morris | H02G 9/06 | 254/134.4 |
| 2008/0309104 A1* | 12/2008 | McSweyn | H02G 1/088 | 294/132 |
| 2009/0070966 A1* | 3/2009 | Gohlke | H02G 1/081 | 24/136 R |
| 2009/0224220 A1* | 9/2009 | Jordan | H02G 1/081 | 254/134.3 R |
| 2009/0245738 A1* | 10/2009 | Hammons | G02B 6/4463 | 254/134.7 |
| 2009/0302286 A1* | 12/2009 | Stevens | H02G 1/081 | 254/134.3 R |
| 2010/0051886 A1* | 3/2010 | Cooke | H02G 1/081 | 254/134.3 R |
| 2010/0072440 A1* | 3/2010 | Wright | H02G 1/081 | 254/134.3 R |
| 2010/0102286 A1* | 4/2010 | Jordan | H02G 1/081 | 254/134.3 PA |
| 2010/0258771 A1* | 10/2010 | White | H02G 1/081 | 254/134.3 R |
| 2010/0322584 A1* | 12/2010 | Kowalczyk | G02B 6/4465 | 385/136 |
| 2012/0049140 A1* | 3/2012 | Logtenberg | H02G 9/06 | 254/134.3 FT |
| 2012/0141075 A1* | 6/2012 | Griffiths | H02G 1/081 | 385/77 |
| 2012/0187353 A1* | 7/2012 | Haslacher | H02G 1/083 | 254/134.3 FT |
| 2013/0134370 A1* | 5/2013 | Leonard | G02B 6/4465 | 254/134.3 R |
| 2013/0221299 A1* | 8/2013 | DiTucci | H02G 1/081 | 254/134.3 R |
| 2014/0138151 A1* | 5/2014 | Islam | H01B 11/22 | 174/71 R |
| 2014/0140669 A1* | 5/2014 | Islam | G02B 6/4416 | 385/100 |
| 2014/0157577 A1* | 6/2014 | Simmons | H01R 43/28 | 29/445 |
| 2014/0196271 A1* | 7/2014 | Coscarella | H02G 3/22 | 29/428 |
| 2014/0353561 A1* | 12/2014 | Chen | G02B 6/54 | 254/134.3 CL |
| 2015/0014468 A1* | 1/2015 | Carlson | B65H 55/005 | 242/594 |
| 2015/0016096 A1* | 1/2015 | Parson | B25F 5/02 | 362/109 |
| 2015/0034891 A1* | 2/2015 | Carlson | H02G 1/081 | 254/134.3 R |
| 2015/0114682 A1* | 4/2015 | Tatat | H02G 1/081 | 174/135 |
| 2017/0089501 A1* | 3/2017 | Tjader | F16L 55/18 | |
| 2018/0129009 A1* | 5/2018 | Rose | G02B 6/508 | |
| 2018/0254617 A1* | 9/2018 | Josefiv | B65H 75/305 | |
| 2018/0323595 A1* | 11/2018 | Leigh | H02G 1/04 | |
| 2019/0109441 A1* | 4/2019 | Crompton | F16G 11/025 | |
| 2019/0148923 A1* | 5/2019 | King | H02G 1/081 | 254/134.3 R |
| 2019/0280468 A1* | 9/2019 | Andreasen | H02G 3/0481 | |
| 2020/0018916 A1* | 1/2020 | Zhu | G02B 6/4471 | |
| 2020/0036172 A1* | 1/2020 | Williams | H02G 1/081 | |
| 2020/0091690 A1* | 3/2020 | Smith | H02G 1/081 | |

\* cited by examiner

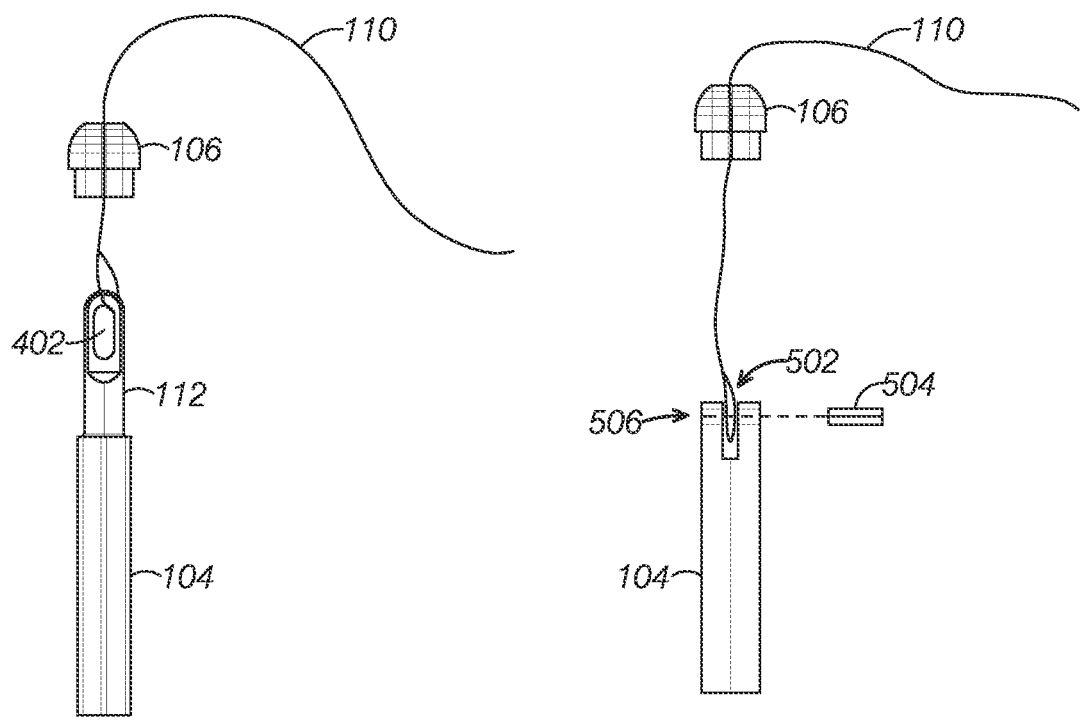
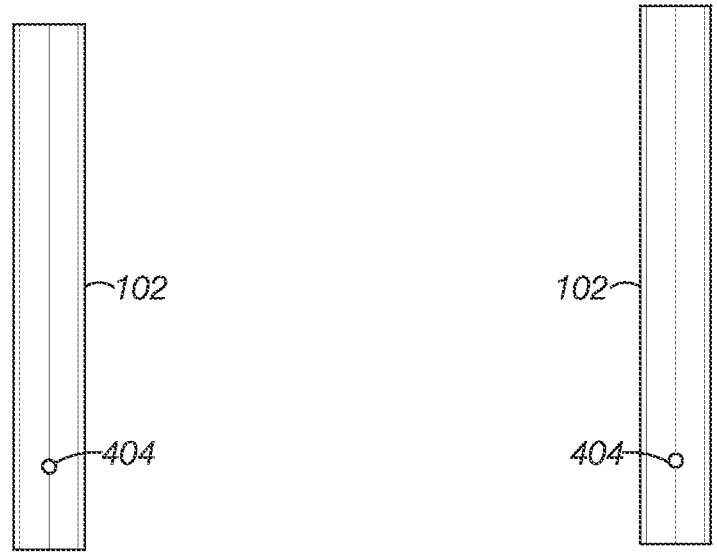
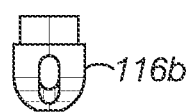
FIG. 4  FIG. 5

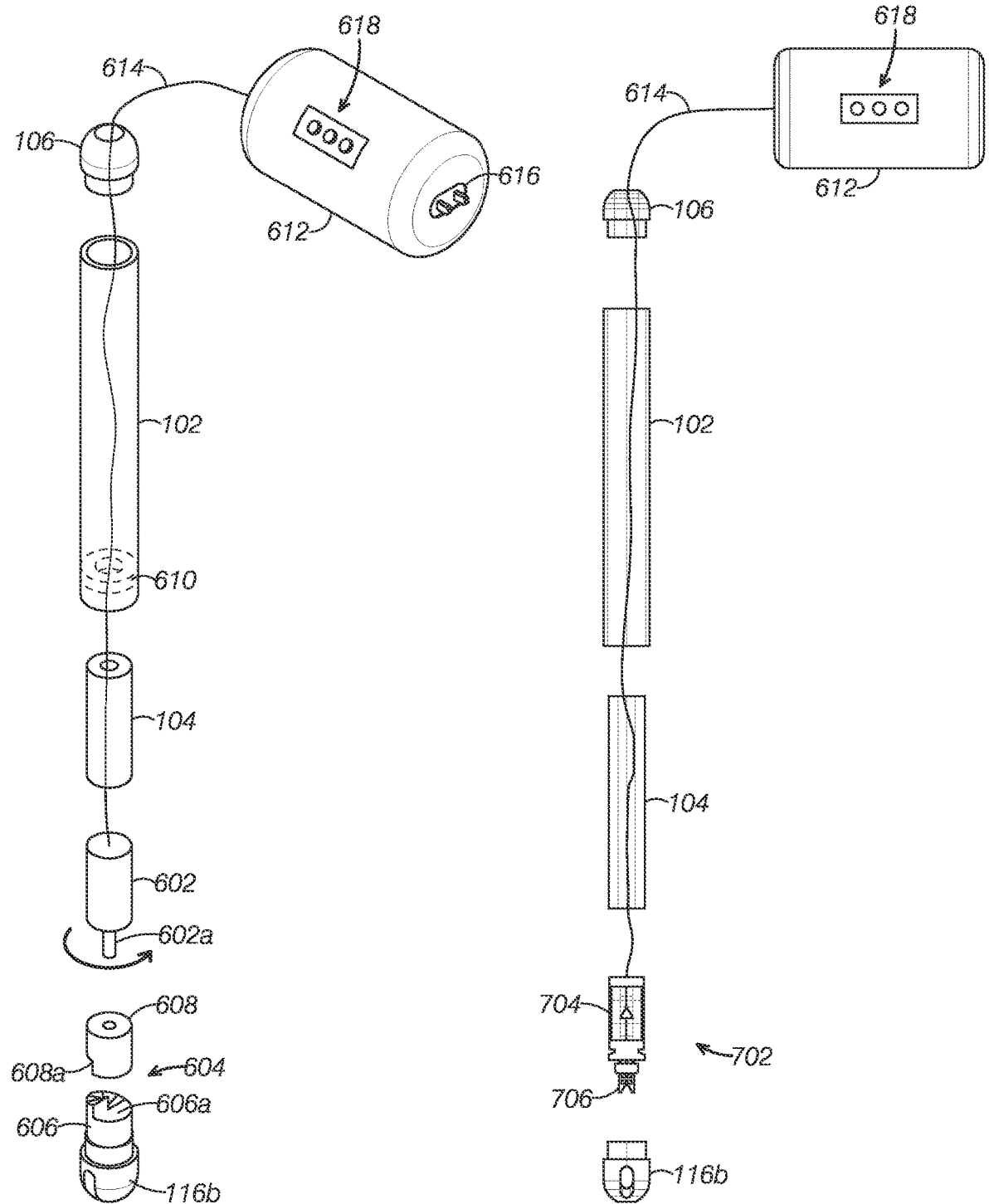

APPARATUS AND METHOD FOR INSTALLING WIRE BEHIND EXISTING WALLS

PRIORITY CLAIM

This application claims priority to copending U.S. Provisional Application, Ser. No. 63/020,385, filed on May 5, 2020, entitled Installers Wire, String, Raceway and Tubing Puller With Hammering Weight, which is hereby incorporated by reference for all purposes.

BACKGROUND OF THE INVENTION

Installers often must pull wires, string, raceways and tubing into walls with minimal deconstruction of the wall to add that wire, string, raceway or tubing. Customers and installers alike prefer that this be accomplished by creating the smallest hole possible in the wall. Sometimes walls are fire rated and putting too large a hole in the wall to allow for wire, string, raceway and tubing installation would compromise the fire rating. Sometimes walls are soundproof rated and putting too large a hole in the wall to allow for wire, string, raceway and tubing installation would compromise its sound rating. It is typically less expensive to repair a small hole than to repair a large one. Common types of wire, string, raceway and tubing pullers include "fishing" rods or magnetic devices that are inserted through a hole. The invention of this disclosure is dissimilar to both these commonly used tools.

Known methods for installing wires, strings, raceways and/or tubing with opening walls to do so are not entirely satisfactory for the range of applications in which they are employed. For example, existing "fishing" poles that are inserted into a hole in a wall close to the ceiling or floor are not effective because the fishing poles are too long to be able to be inserted in a hole adjacent or in close proximity to the ceiling above the wall being worked on. In addition, conventional fishing poles are usually too long to carry in tool kits or belts, being up to over a yard long, as well as the inability for the rods to move through the wall in a predictable linear manner. Also unsatisfactory are the magnetic devices which can scratch walls or not work at all due to double thick dry wall preventing the magnet from working properly, and the inability for the magnets to maneuver around some obstructions within the wall.

Accordingly, in the arts of puller systems, there is a need in the arts for improved methods, apparatus, and systems for wire, string, raceway and tubing pullers that improve upon and advance the design of known devices.

SUMMARY OF THE INVENTION

Embodiments of a puller system provide a system and method for pulling a string or wire behind a wall. One embodiment comprises a cylindrical weight defined by an outside diameter and a first length, and a tubular body with a hollow interior defined by an inside diameter that is greater than the outside diameter of the cylindrical weight and a second length that is greater than the first length. A distal end of the tubular body includes a tip configured to penetrate a material that is behind the wall, wherein when oriented in a vertical position behind the wall, and wherein in response to drawing the cylindrical weight upward through the tubular body and then releasing the cylindrical weight, the cylindrical weight travels downward towards the distal end of the tubular body and impacts the tip such that momentum of the downward travelling cylindrical weight is transferred to the tip, thereby driving the tubular body downward through the material.

BRIEF DESCRIPTION OF THE DRAWINGS

The components in the drawings are not necessarily to scale relative to each other. Like reference numerals designate corresponding parts throughout the several views.

FIG. 4 is an exploded side view of an example embodiment of a puller system with an aperture disposed in the proximal end of the cylindrical weight.

FIG. 5 is an exploded side view of an example embodiment of a puller system with a slot and pin disposed in the proximal end of the cylindrical weight.

FIG. 6 is an exploded perspective view of an alternative example embodiment of a puller system provisioned with an electric motor and cam system.

FIG. 7 is an exploded cross sectional side view of an example embodiment of a puller system provisioned with a solenoid system.

DETAILED DESCRIPTION

Figure 1:
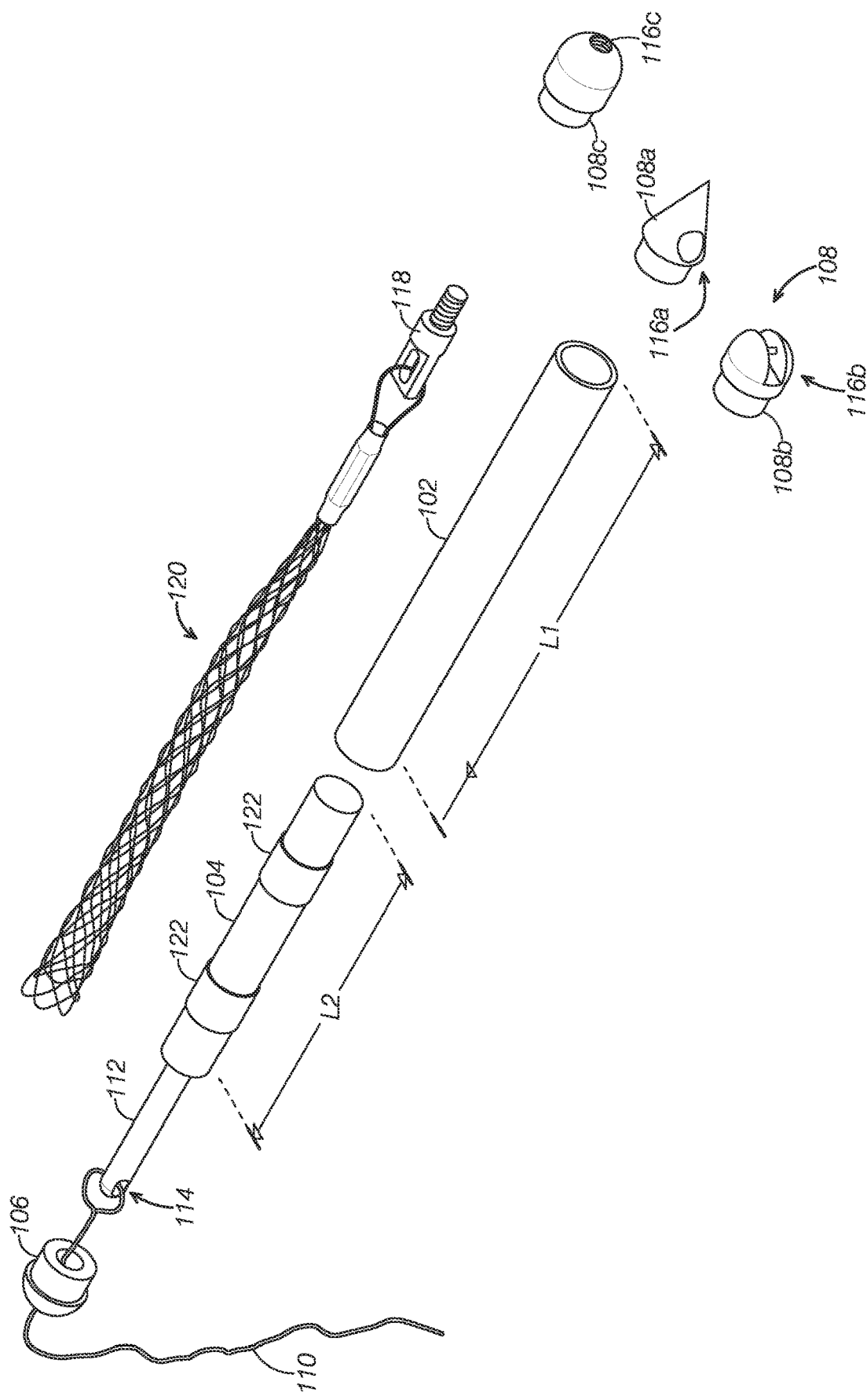
FIG. 1 is an exploded perspective view of a first example embodiment of a puller system.

FIG. 1 is an exploded perspective view of an example first embodiment of a puller system 100. Embodiments of the puller system 100 is used to pull a string or wire behind a wall, and is configured to penetrate an insulative material that is behind the wall. The insulative material may be a for thermal insulation, sound insulation, and/or fire insulation.

The disclosed systems and methods for a puller system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for a puller system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly through a communication network 108. "Controllably coupled" means that an electronic device controls operation of another electronic device.

Returning to FIG. 1, the example embodiment of the puller system 100 is a manually operated system. The manually operated puller system 100 comprises a body 102, a weight 104, a cap 106, at least one tip 108, and an optional weight extension member 112.

In the various embodiments, the body 102 defines a hollow tubular shape with openings at its two ends. The body 102 is defined by an inside diameter and a length ($L_1$). The distal impact end secures the tip 108 and a proximal end secures the cap 106. In an example embodiment, the cap 106 and/or the tip 108 are releasably secured to the ends of the body 102 using threads. Alternatively, the cap 106 and/or the tip 108 may be secured to the body 102 using a frictional fit. Other securing means may be used. In some embodiments, the body 102 and the cap 106 and/or the tip 108 may be permanently secured to the end of the body using a suitable adhesive, wielding, screws, or the like. In some embodiments, the body 102 and the cap 106 and/or the tip 108 may be made during fabrication into a unibody member.

The cylindrical weight 104 is defined by an outside diameter and a length ($L_2$). The weight 104 slidably moves up and down within the hollow interior cavity of the body 102. Accordingly, the outside diameter of the cylindrical weight 104 is less than the inside diameter of the body 102.

A distal end of the weight extension member 112 is secured to a proximal end of the weight 104. In some embodiments, the weight 104 and the weight extension member 112 are separate members releasably secured to each other using threads. Alternatively, the weight 104 and the weight extension member 112 may be secured together using a frictional fit or a cam like fitting. Other securing means may be used. In some embodiments, the weight 104 and the weight extension member 112 may be permanently secured to each other using a suitable adhesive, wielding, screws, or the like. In some embodiments, the weight 104 and the weight extension member 112 may be made during fabrication into a unibody member.

The weight 104 itself has a distal impact end. The weight 104 is cylindrical and is relatively heavy. In the various embodiments, the weight 104 is made from a dense material such as tungsten, cobalt, molybdenum, brass, aluminum, steel, iron or even lead, and is configured to slidably move within the hollow of the body 102 from one end of the body 102 to the other of the body 102 along a travel distance [defined by the difference between the length ($L_1$) of the body 102 and the length ($L_2$) of the cylindrical weight 104].

A string or wire 110 is attached to the proximal attachment end of the weight extension member 112. Accordingly, to accommodate the string or wire 110, the proximal end of the weight extension member 112 is defined by an attachment means 114, such as a hole, that is at least sized to permit the string or wire 110 to be threaded therethrough. The cap 106 is defined by an opening through which the string or wire 110 attached to the weight extension member 112. In a preferred embodiment, the hole in the cap 106 has an inside diameter that is greater than an outside diameter of the narrow portion of the weight extension member 112, but less than the outside diameter of the cylindrical weight 104. The string or wire 110 may be pulled to draw the weight 104 and the weight extension member 112 upward, but the cap 106 opening's size prevents the weight 104 from being pulled out of the body 102.

In an alternative embodiment, the weight extension member 112 is omitted. Here, the string or wire 110 is secured to the distal end of the cylindrical weight 104. However, an unexpected advantage provided by the weight extension member 112 is to eliminate frictional wear on the string or wire 110 that might otherwise result in failure of the string or wire 110. That is, if the string or wire 110 breaks during use, the user may have to cut into the wall to retrieve the puller system 100.

In practice, a hole is cut into the wall. The wall hole is preferably just large enough to receive the puller system 100. A user inserts the puller system 100 through the upper wall hole and orients the puller system 100 in a downward directed vertical, or substantially vertical, orientation such that its length ($L_1$) is substantially perpendicular to the ground, and such that the tip 108 is directed towards the ground.

Once the puller system 100 in position behind the wall, with the example manual embodiment, the user pulls the proximal end of the string or wire 110 to draw the cylindrical weight 104 upward through the body 102. The travel distance of the cylindrical weight 104 is equal to the difference between the length ($L_1$) of the body 102 and the length ($L_2$) of the cylindrical weight 104. The word "string" is used herein generically to mean string, cable, rope or wire, as needs dictate.

When the weight 104 has been drawn upward to or near its furthest extent within the body 102 by the user, the user releases the string or wire 110. Gravity accelerates and pulls the cylindrical weight 104 downward toward the impact end of the body 102 and the tip 108. As the cylindrical weight 104 travels downward towards the distal end of the tubular body 102, the cylindrical weight 104 gains momentum. The distal end of the released downward travelling cylindrical weight 104 impacts the tip 108 at the distal end of the tubular body 102 such that momentum of the downward travelling cylindrical weight 104 is transferred to the tip 108 as a downward directed force. The downward directed hammering force causes the surrounding insulation material to give way and allow the puller system 100 to hammer its way through or around that insulation material, or to hammer its way between the insulation material and the wall.

When the user repeatedly pulls and releases the string or wire 110, the attached cylindrical weight 104 is repeatedly pulled upward and then dropped to the bottom of the body 102. The cylindrical weight 104 repeatedly hammers into the tip 108. Accordingly, the puller system 100 hammers its way in a linear path downward through the insulation, or between the wall and the insulation, towards the ground. When the puller system 100 has travelled downward through the insulation or behind the insulation to a desired distance, the user will have access to the tip 108 through a second lower wall hole that has been cut into the wall. At the end of the installation process, the relatively small lower wall hole is substantially easier to patch or repair than a wall hole required of legacy pullers.

Various types of tips 108 may be used by the various embodiments depending upon the nature of the particular task at hand. Preferably, the tip 108 is typically made from a hard material such as tungsten, cobalt, molybdenum, brass, iron or even lead so that it is sufficiently strong to resist being deformed by the repeated impact of the cylindrical weight 104, or repeated external impacts. However, these materials are not the only types of material from which the tip 108 may be constructed. Any suitable material having a hardness that is greater than a hardness and/or resistance of the insulation material may be used.

A penetration tip 108a may be used to penetrate the insulation material. The penetration tip 108a has a conical distal end that terminates in a sharp point to facilitate penetration of the puller system 100 through the insulation material.

An insulation displacement tip 108b may have a rounded distal end that is configured to displace the insulation material as the puller system 100 moves in the downward direction. Displacing the insulation material by pushing the material out of the way of the puller system 100 may cause relatively less damage to the insulation material, such as when the puller system 100 travels between the inside of the wall and the outside of the insulation material.

The tip 108 includes an attachment means 116 that is configured to receive a string or pull wire (not shown). The user, having access to the tip 108 through the lower wall hole, secures the string or pull wire to the tip 108. In one example, an aperture (hole) 116a is disposed in the tip 108. In another embodiment, a slot and pin 116b may be disposed in the distal end of the tip 108, wherein a clip, hook or the like secured to the end of the string or pull wire may be attached to the pin 116b.

A threaded receiver tip 108c may be used to prove a threaded-based attachment means that is configured to receive a threaded pin 118 that is screwed into the threaded hole 116c of the threaded receiver tip 108c. The non-limiting example threaded pin is secured to a wire puller 120 which may be used to retrieve the puller system 100. In this example embodiment, the wire puller 120 is made of a mesh of flexible strong wire that can be secured to the threaded receiver tip 108c once the puller system 100 has reached the lower wall hole. The flexibility of the wire puller 120 enables the user to orient the threaded pin 118 when threading it to the threaded hole 116c. In some embodiments, a barrel swivel or the like may be used to facilitate rotation of the threaded pin 118 when being screwed into the threaded hole 116c.

When the user pulls on the string or wire 110 to retrieve the puller system 100 upwards and back to the upper wall hole, the string or pull wire secured to the tip 108 is drawn upward along with the puller system 100 (wherein a proximal portion of the string or pull wire always remains outside of the lower wall hole). When the user retrieves the puller system 100 from the wall, the user may then detach the string or pull wire from the tip 108. The string or pull wire can then be used to pull a wire, rope, raceway, tube or the like downward (or upward) through the upper and lower wall holes.

In the various embodiments, the body 102, tip 108, and/or the string or wire 110 may be painted or colored with a highly visible color, including bright colors that contrast the with the wall and the insulation material, such as, but not limited to, bright orange and/or bright green. In some embodiments, the distal end of the body 102 and/or the tip 108 may be illuminated. The visible color and/or illumination will assist the user in discerning the location of the tip 108 of the puller system 100 through the lower hole.

One or more optional anti-friction spacers 122 may be used to prevent or reduce friction resistance between the body 102 and the cylindrical weight 104. Further, the anti-friction spacers 122 keep the cylindrical weight 104 centered within the interior of the body 102.

The anti-friction spacers 122 may be cylindrical and fit around the outside of the cylindrical weight 104. In such embodiments, a difference between the outside diameter of the cylindrical weight 104 and the inside diameter of the body 102 is equal to, or slightly large than, twice the thickness of the anti-friction spacers 122. The anti-friction spacers 122 may also help guide the cylindrical weight 104 as it moves up and down within the body 102.

In an alternative embodiment, the anti-friction spacers 122 are secured to the interior surface of the body 102. In other embodiments, strips of anti-friction spacers 122 may be secured along the length of the body 102 and/or the cylindrical weight 104.

In some embodiments, the anti-friction spacers 122 are frictionally retained in their position. Alternatively, or additionally, an adhesive may be used to retain the anti-friction spacers 122 in their position. Alternatively, or additionally, a fastener such as a bolt, clip, screw, or the like may be used to retain the anti-friction spacers 122.

Figure 2:
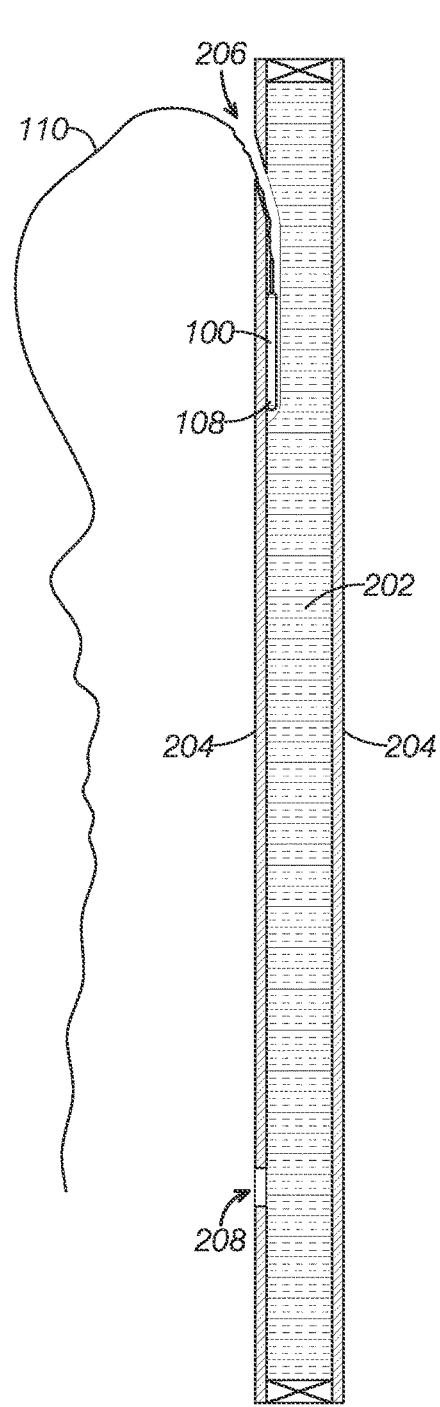
FIG. 2 is a cross section of a wall having batt insulation inside of the wall with a puller system moving downward between the inside of the wall and the batt insulation.

FIG. 2 is a cross section of a wall having batt insulation 202 inside of the wall 204 with a puller system 100 moving downward between the inside of the wall 204 and the batt insulation 202. In this example use, the puller system 100 is displacing the batt insulation 202 so as to travel downward between the wall 204 and the batt insulation 202. In this example use, the insulation displacement tip 108b with a rounded distal end that is configured to displace the insulation material might be used.

The puller system 100 is inserted between the inside surface of the wall 204 and the batt insulation 202 via the upper wall hole 206. When tip 108 of the puller system 100 travels downward to at least the lower hole 208, the user can then access the puller system 100 via the lower hole 208.

Figure 3:
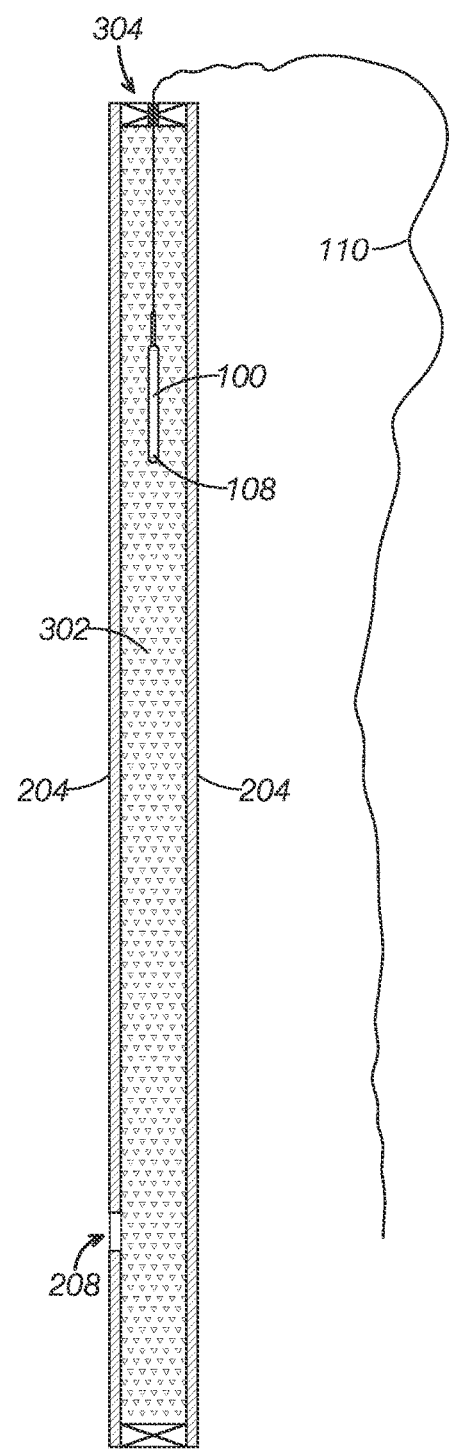
FIG. 3 is a cross section of a wall having blown in insulation with a puller system moving downward through the blown insulation.

FIG. 3 is a cross section of a wall having blown-in insulation 302 with a puller system 100 moving downward through the blown-in insulation 302. Here, the puller system 100 is penetrating the blown-in insulation 302 so as to travel downward through the blown-in insulation 302. In this example use, the penetration tip 108a with a sharp distal end that is configured to penetrate the insulation material might be used In this non-limiting illustrative example, the puller system 100 is conceptually illustrated as being inserted through a hole disposed in, or gap 304 between, the wall joists, top plate, upper wall plate, or the like, and then down into the batt insulation 202. When tip 108 of the puller system 100 travels downward to at least the lower hole 208, the user can then access the puller system 100 via the lower hole 208.

FIG. 4 is an exploded side view of an example embodiment of a puller system with an aperture 402 disposed in the proximal end of the cylindrical weight 104. The aperture 402 permits the user to secure the distal end of the string or wire 110 to the proximal end of the weight extension member 112.

FIG. 5 is an exploded side view of an alternative example embodiment of a puller system with a slot 502 disposed in the proximal end of the cylindrical weight 104. A pin 504 is inserted through holes 506 disposed in the slot member portion of the cylindrical weight 104 (or a weight extension member 112 if present) having the slot 504. The user inserts a loop at the distal end of the string or wire 110 into the slot 502. The user then inserts the pin 504 through the holes 506 disposed in the slot member portion and the loop of the string or wire 110, thereby securing the distal end of the string or wire 110 to the proximal end of the weight extension member 112.

Also illustrated in FIGS. 4 and 5 is an aperture (hole) disposed in the lower portion of the distal end of the body 102. As the cylindrical weight 104 travels downward, air pressure would otherwise build up in the lower end of the body 102 and slow the downward motion of the weight extension member 112. The aperture 404 permits the release of the air in the lower portion of the body 102, thereby releasing any built up air pressure. When the user pulls the string or wire 110 to move the cylindrical weight 104 upward within the body 102, air is allowed to enter through the hole 404 so that a suction force (negative air pressure) does not impede the drawing of the cylindrical weight 104 in an upward direction. A similar aperture may be disposed in the upper portion of the body 102 to allow air to freely escape and/or enter into the upper cavity of the body 102 as the cylindrical weight 104 is drawn upward and/or moves downward. Alternatively, or additionally, channels, slots or the like may be disposed in the outer surface of the weight 104 and/or in the inner surface of the body 102 to permit the flow of air (FIG. 4).

FIG. 6 is an exploded perspective view of an alternative example embodiment of a puller system 100 provisioned with an electric motor 602 and cam system 604. The cam system 604 comprises a first cam member 606 and a second cam member 608.

For convenience, the first cam member 606 is illustrated as having its distal end secured to the proximal end of the tip 116b. The first cam member 606 may be secured to the tip 116b using any suitable means, such as an adhesive, threads, screws, clips or the like. Alternatively, the tip 116b and the first cam member 606 may be fabricated as a unibody member during fabrication. In other embodiments, the distal end of the first cam member 606 may rest on top of the tip 116b.

Alternatively, the outside surface of the second cam member 608 may be secured to the inside surface of the body 102 proximate to the distal end of the body 102. The first cam member 606 may be secured to the body 102 using any suitable means, such as an adhesive, threads, screws, clips or the like. Alternatively, the first cam member 606 and the body 102 may be fabricated as a unibody member during fabrication. Alternatively, an optional stop ring 610 may be secured to the inside of the body 102 proximate to the distal end of the body 102, wherein the distal end of the first cam member 606 rests upon and/or is secured to the proximal end of the optional stop ring 610.

The electric motor 602 is controllably coupled to a controller 612 via a power cord or control cord 614. Preferably, the cord 614 has sufficient tensile strength to allow retrieval of the puller system 100. Alternatively, a string or wire 110 may be secured to the proximal end of the puller system 100 to facilitate retrieval of the puller system 100.

In an example embodiment, the controller 612 includes a power plug adaptor 616 that is configured to couple to a legacy power cord (not shown) and/or to a wall power outlet. Power to drive the electric motor 602 (using power received at the power plug adaptor 616) is provided via the cord 614. Alternatively, or additionally, the controller 612 may include an internal power source, such as a battery or the like (not shown) that provides power to the electric motor 602.

A plurality of actuators 618 are disposed on the surface of the controller 612. The actuators allow the user to power on/turn off the electric motor 602. Additionally, the controllers 618 may be used to control the speed of rotation of the shaft 602a of the electric motor 602.

A shaft 602a of the electric motor 602 is secured to the proximal end of the second cam member 608. The shaft 602a may be secured to the second cam member 608 using any suitable means, such as an adhesive, threads, screws, clips or the like. Alternatively, the shaft 602a and the second cam member 608 may be fabricated as a unibody member during fabrication.

In the illustrated example embodiment of FIG. 6, the distal end of the cylindrical weight 104 rests upon or is secured to the proximal end of the electric motor 602. The cylindrical weight 104 may be secured to the electric motor 602 using any suitable means, such as an adhesive, threads, screws, clips or the like. Alternatively, the cylindrical weight 104 and the electric motor 602 may be fabricated as a unibody member during fabrication The first cam member 606 is defined at its distal end by a first cam surface 606a. The second cam member 608 is defined at is proximal end by a second cam surface 608a. As the shaft 602a of the electric motor 602 is rotated, the first cam surface 606a and the second cam surface 608a slidably engage each other to raise the cylindrical weight 104. As the shaft 602a of the electric motor 602 completes a revolution, the first cam surface 606a and the second cam surface 608a disengage to release the cylindrical weight 104, which then falls downward to impact the tip 116b (or an intervening structure which transfers the force to the tip 116b).

Repeated revolutions of the shaft 602a of the electric motor 602 create a repeated downward impact force on the tip 108. Accordingly, the puller system 100 travels in a downward direction. The speed of rotation of the shaft 602a of the electric motor 602 may be predefined, or may be adjustable by the user by actuation one or the actuators 618 on the controller 612.

The illustrated arrangement of the components illustrated in FIG. 6 is exemplary only and is not intended to be limiting. The illustrated component may be arranged in a different order in an example embodiment. For example, the electric motor 602 may be located above the cylindrical weight 104, wherein the shaft 602a of the electric motor 602 extends through an aperture (hone) extending through the cylindrical weight 104. In an alternative embodiment, the cylindrical weight 104 may itself be fabricated as an electric motor. Any such variations are intended to be within the scope of this disclosure and to be protected by the following claims.

FIG. 7 is an exploded cross sectional side view of an example embodiment of a puller system 100 provisioned with a solenoid system 702. The solenoid system 702 comprises a solenoid housing 704 and a push rod 706 (illustrated in a retracted position).

The distal end of the example push rod 706 is coupled to the tip 116b using a coupling fork as is known in the arts. The proximal end of the solenoid housing 704 is in contact with, or is secured to, the distal end of the cylindrical weight 104. The cord 614 extends through an aperture in the cylindrical weight 104 to provide power to actuate the solenoid system 702. As is known in the art, an electric motor/machine (not shown) resides in the interior of the solenoid housing 704 that is operable to push the push rod 706 outward to an extended position and to pull the push rod 706 inward to a retracted position in an alternating manner.

In the non-limiting example embodiment illustrated in FIG. 7, when the solenoid system 702 is actuated by the controller 612, the push rod 706 is pushed outward to its extended position, thereby raising the cylindrical weight 104. When the solenoid system 702 is next actuated, the solenoid system 702 rapidly retracts the push rod 706, thereby moving the cylindrical weight 104 in a downward direction. The momentum of the downward moving cylindrical weight 104 is transferred as a force to the tip 116b when the push rod 706 becomes fully retracted.

Repeated actuations of the solenoid system 702 create a repeated downward impact force on the tip 108. Accordingly, the puller system 100 travels in a downward direction.

The solenoid system 702 is powered and/or is controlled by the controller 612 via the cord 614, and is not described herein for brevity. In some embodiments, the controller 612 may be controlled by the user to control the rate of extension/retraction of the push rod 706. Additionally, or alternatively, the travel distance of the push rod 706 may be controlled by the controller 612.

The illustrated arrangement of the components illustrated in FIG. 7 is exemplary only and is not intended to be limiting. The illustrated component may be arranged in a different order in an example embodiment. For example, the solenoid system 702 may be located above the cylindrical weight 104, wherein the push rod 706 is secured to the proximal end of the cylindrical weight 104. Here, the solenoid housing 704 would be secured to the inside surface of the body 102 and/or to the cap 106. In an alternative embodiment, the cylindrical weight 104 may itself be fabricated as a component of the solenoid system 702. Any such variations are intended to be within the scope of this disclosure and to be protected by the following claims.

Figure 8:
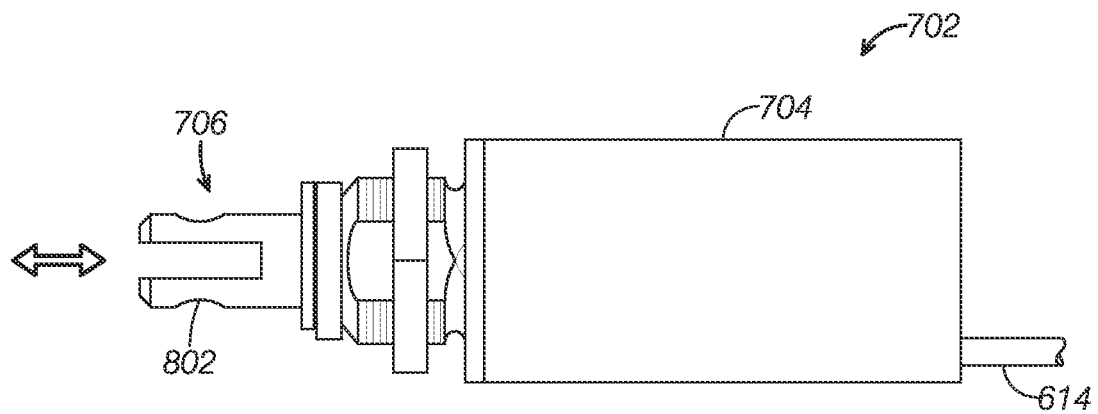
FIG. 8 is a side view of a first type of readily available legacy solenoid that may be used with embodiments of the puller system.
Figure 9:
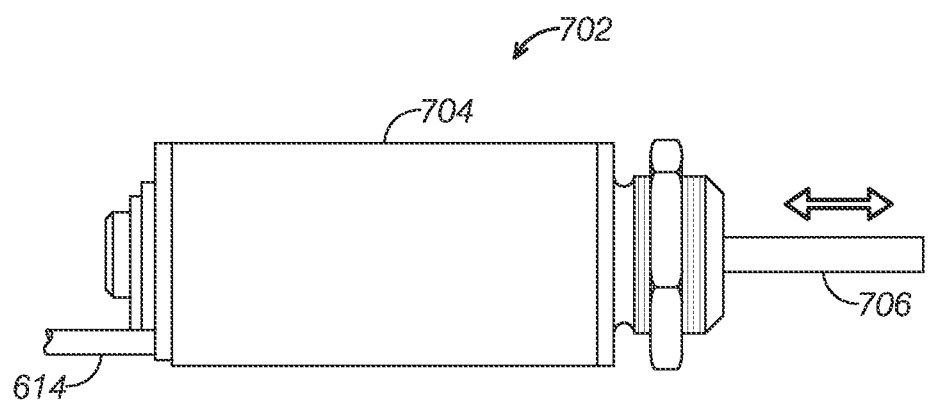
FIG. 9 is a side view of a second type of readily available legacy solenoid that may be used with embodiments of the puller system.

FIG. 8 is a side view of a first type of readily available legacy solenoid 702 that may be used with embodiments of the puller system 100. FIG. 9 is a side view of a second type of readily available legacy solenoid 702 that may be used with embodiments of the puller system 100.

Figures 10, 11:
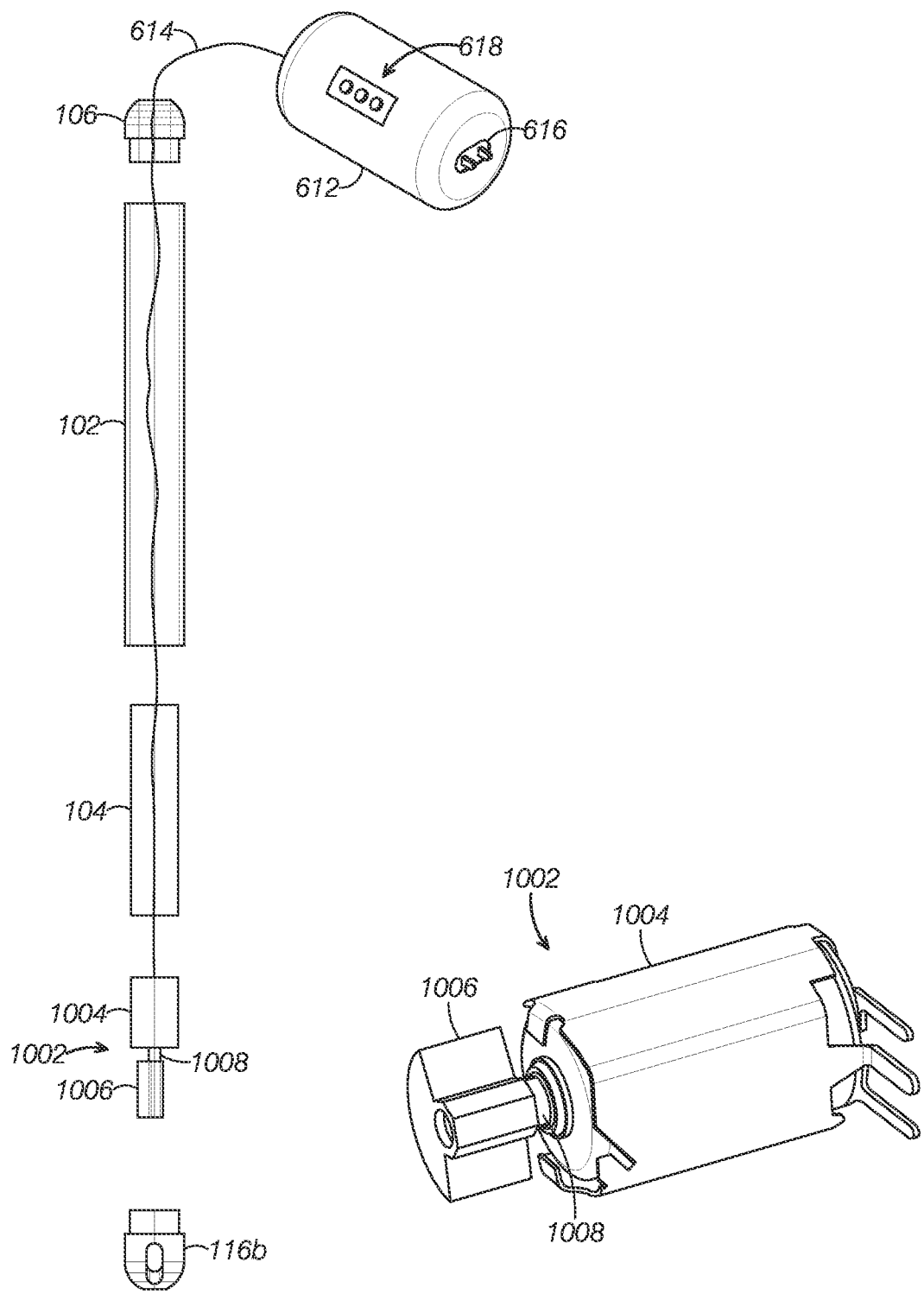
FIG. 10 is an exploded cross sectional side view of an example embodiment of a puller system provisioned with a vibration system.
FIG. 11 is a side view of a readily available legacy vibrator motor and vibrator weight that may be used with embodiments of the puller system.

FIG. 10 is an exploded cross sectional side view of an example embodiment of a puller system 100 provisioned with a vibration system 1002. The vibration system 1002 comprises an electric vibrator motor 1004 and a vibrator weight 1006 secured to the shaft 1008 of the vibrator motor 1004. FIG. 11 is a side view of a readily available legacy vibrator motor 1004 and vibrator weight 1006 that may be used with embodiments of the puller system 100.

The vibrator weight 1006 is configured to have a center of gravity that is off center from the shaft 1008 of the vibrator motor 1004. As the vibrator motor 1004 rotates the shaft 1008, the vibrator weight 1006 is rotated in a manner wherein the off center point of gravity of the vibrator weight 1006 induces a wobbling motion to the shaft and vibrator motor 1004. When the vibrator motor 1004 is secured to the body 102, a vibration movement is imparted to the tip 116b. This vibration movement facilitates the downward movement of the puller system 100.

The vibrator motor 1004 may be secured to the body 102 using any suitable means, such as an adhesive, threads, screws, clips or the like. Alternatively, the vibrator motor 1004 and the body 102 may be fabricated as a unibody member during fabrication.

In an alternative embodiment, the vibrator motor 1004 may be secured to the cylindrical weight 104. However, this embodiment is not as effective of inducing the vibration movement into the tip 116b. In another alternative embodiment, the vibrator motor 1004 is secured to the proximal end of the tip 116b (wherein the orientation of the vibration system 1002 is reversed respective to FIG. 10).

In some embodiments, the vibration system 1002 may be provisioned in a manual embodiment of the puller system 100 (as illustrated in FIG. 1). Here, the manual raising and dropping of the cylindrical weight 104, in conjunction with the vibration movement imparted to the tip 108 by the vibration system 1002, cooperatively urge the puller system 100 in the downward direction.

In some embodiments, the vibration system 1002 may be provisioned in an embodiment of the puller system 100 that employs the solenoid system 702 (as illustrated in FIG. 7). Here, the automatic raising and dropping of the cylindrical weight 104 by the solenoid system 702, in conjunction with the vibration movement imparted to the tip 108 by the vibration system 1002, cooperatively urge the puller system 100 in the downward direction.

In the various embodiments, the body 102 and the cylindrical weight 104 were described as being cylindrical. In alternative embodiments, the hollow cavity of the interior of the body 102 and the cylindrical weight 104 may have other cross sectional shapes, such as, but not limited to, squares, rectangles, ovals, or the like. Here, the cross sectional shape of the weight 104 and the corresponding cross sectional shape of the interior of the body 102 are the same. A distance associated with the weight 104 (such as a circumference, a length, and/or a width) is less that the corresponding distance of the hollow cavity in the interior of the body 102.

Further, in some embodiments, the cross sectional shape of the interior of the body 102 may be different than a cross sectional shape of the exterior of the body 102. For example, but not limited to, the interior of the cavity of the body 102 and the weight 104 may be square, and the exterior cross section of the body may be circular.

In some manual embodiments, the user may pull on the proximal end of the string or wire 110 that is attached to the proximal attachment end of the weight extension member 112 using a brake-like system similar to brakes used on a bicycle. The user squeezes on the lever, which then retracts the string or wire 110 to draw the weight extension member 112 (or the cylindrical weight 104) upward.

It should be emphasized that the above-described embodiments of the puller system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A puller system that pulls one of a string or wire behind a wall, comprising:
   a weight;
      wherein the weight is cylindrical,
      wherein the cylindrical weight is defined by an outside diameter, and
      wherein the cylindrical weight is defined by a first length; and
   a body,
      wherein the body is tubular with a hollow interior,
      wherein the hollow interior of the tubular body is defined by an inside diameter that is greater than the outside diameter of the cylindrical weight;
      wherein a distal end of the tubular body includes a tip that is configured to penetrate a material that is behind the wall,
      wherein the tubular body is defined by a second length that is greater than the first length of the cylindrical weight, and
      wherein a proximal end of the tubular body is configured to slidably receive the cylindrical weight,
   wherein the tubular body is oriented in a substantially vertical position behind the wall, the material resists downward movement of the puller system,
   wherein in response to drawing the cylindrical weight upward through the tubular body and then releasing the cylindrical weight, the cylindrical weight travels downward towards the distal end of the tubular body, and
   wherein a distal end of the released downward travelling cylindrical weight impacts the tip at the distal end of the tubular body such that momentum of the downward travelling cylindrical weight is transferred to the tip thereby driving the tubular body downward through the material behind the wall.

2. The puller system of claim 1, further comprising:
   a cap,
      wherein the cap is secured to the proximal end of the tubular body, and
      wherein a through hole extends through a center of the cap, and
      wherein the through hole is defined by an inside diameter; and
   a weight extension member,
      wherein a distal end of the weight extension member is secured to a proximal end of the cylindrical weight,
      wherein an outside diameter of the through hole of the cap is less than the inside diameter of the cap, and
      wherein a proximal end of the weight extension member extends through the through hole of the cap,
   wherein when the cylindrical weight is drawn upward through the tubular body, the weight extension member is drawn upward through the through hole of the cap.

3. The puller system of claim 2,
   wherein the inside diameter of the through hole of the cap is less that the outside diameter of the cylindrical weight,
   wherein the distal end of the cap stops the upward movement of the cylindrical weight when the cylindrical weight is drawn upward through the tubular body.

4. The puller system of claim 2,
   wherein the proximal end of the weight extension member includes an aperture,
   wherein a distal end of the string or wire is secured to the proximal end of the weight extension member at the aperture,
   wherein a user pulls a proximal end of the string or wire to draw the cylindrical weight upward through the tubular body, and
   wherein the user releases the proximal end of the string or wire to release the cylindrical weight.

5. The puller system of claim 2,
   wherein the proximal end of the weight extension member includes a slot,
   wherein apertures are disposed through the weight extension member at the slot,
   the puller system further comprising:
      a pin, wherein the pin is extended through the apertures and the slot of the weight extension member,
   wherein a distal end of the string or wire is secured to the pin at the slot,
   wherein a user pulls a proximal end of the string or wire to draw the cylindrical weight upward through the tubular body, and
   wherein the user releases the proximal end of the string or wire to release the cylindrical weight.

6. The puller system of claim 1, wherein when the cylindrical weight is released, gravity pulls the cylindrical weight downward towards the distal end of the tubular body.

7. The puller system of claim 1, further comprising:
   at least one anti-friction spacer secured to the outside of the cylindrical weight,
   wherein the at least one anti-friction spacer facilitates the upward and downward movement of the cylindrical weight within the tubular body by preventing friction between the cylindrical weight and the tubular body.

8. The puller system of claim 1, further comprising:
   the tip,
   wherein the tip is removably secured to the distal end of the tubular body.

9. The puller system of claim 8,
   wherein the tip includes a tip aperture, wherein at the conclusion of the penetration of the puller system though the material, a user attaches a distal end of a pulling wire to the tip at the tip aperture, wherein the user draws the puller system upward through the penetrated material to retrieve the puller system and the pulling wire, and wherein after the user detaches the distal end of the pulling wire from the tip aperture, the user has access to both the distal end of the pulling wire and a proximal end of the pulling wire.

10. The puller system of claim 8, wherein the tip is a first tip that is pointed and that is configured to penetrate a first type of the material, and further comprising:

a second tip, wherein a distal end of the second tip is rounded and is configured to displace a second type of the material; and a third tip, wherein a distal end of the third tip is defined by a threaded hole that is configured to receive a threaded pin of a wire puller.

11. The puller system of claim 1, wherein at least one first aperture extends through the tubular body proximate to the distal end of the tubular body, wherein at least one second aperture extends through the tubular body proximate to the proximal end of the tubular body, wherein air pressure is released through the at least one first aperture as the cylindrical weight travels downward after release, and wherein the air pressure is released through the at least one second aperture as the cylindrical weight is drawn upward through the tubular body.

12. The puller system of claim 1, wherein at least one first aperture extends through the tip, wherein at least one second aperture extends through the tubular body proximate to the proximal end of the tubular body, wherein air pressure is released through the at least one first aperture as the cylindrical weight travels downward after release, and wherein the air pressure is released through the at least one second aperture as the cylindrical weight is drawn upward through the tubular body.

13. The puller system of claim 1, further comprising:

an electric motor residing within the tubular body, a cam secured to the electric motor and the cylindrical weight, wherein rotation of the cam by the electric motor draws the cylindrical weight upward through the tubular body, and wherein after the cam draws the cylindrical weight upward, the cylindrical weight is released.

14. The puller system of claim 1, further comprising:

a vibrational motor secured to the tubular body near the distal end of the tubular body, wherein the vibrational motor imparts a vibration of the tip to facilitate the downward movement of the puller system through the material.

15. The puller system of claim 1, further comprising:

a cylindrical solenoid with a push rod, wherein the cylindrical solenoid is secured to the tubular body, wherein the push rod is secured to the cylindrical weight, wherein in response to a first actuation of the cylindrical solenoid, the push rod draws the cylindrical weight upward through the tubular body, and wherein in response to a second actuation of the cylindrical solenoid, the push rod drives the cylindrical weight downwardly to transfer the momentum of the downward travelling cylindrical weight to the tip thereby driving the tubular body downward through the material behind the wall.

16. The puller system of claim 15, wherein the cylindrical solenoid further includes a spring, and wherein in response to the second actuation of the cylindrical solenoid, the spring propels the push rod to drive the cylindrical weight downwardly.

17. A puller system that pulls one of a string or wire behind a wall, comprising:

a weight;

wherein the weight has a cross sectional shape, wherein an outside surface of the weight is defined by a distance, and wherein the cylindrical weight is defined by a first length; and a body, wherein a hollow cavity in an interior of the body has a cross sectional shape corresponding to the cross sectional shape of the weight, wherein a surface of the hollow cavity in the interior of the body is defined by a second distance that is greater than the first distance of the weight;

wherein a distal end of the body includes a tip that is configured to penetrate a material that is behind the wall, wherein the body is defined by a second length that is greater than the first length of the weight, and wherein a proximal end of the body is configured to slidably receive the weight, wherein the body is oriented in a substantially vertical position behind the wall, the material resists downward movement of the puller system, wherein in response to drawing the weight upward through the body and then releasing the weight, the weight travels downward towards the distal end of the body, and wherein a distal end of the released downward travelling weight impacts the tip at the distal end of the body such that momentum of the downward travelling weight is transferred to the tip thereby driving the body downward through the material behind the wall.

* * * * *